United States Patent
Chen et al.

(10) Patent No.: US 7,367,507 B2
(45) Date of Patent: May 6, 2008

(54) OPTICAL SCANNING MODULE

(75) Inventors: Hsi-Yu Chen, Taipei (TW);
Kuan-Yang Chen, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 0 days.

(21) Appl. No.: 11/422,273

(22) Filed: Jun. 5, 2006

(65) Prior Publication Data

US 2007/0194120 A1    Aug. 23, 2007

(30) Foreign Application Priority Data

Feb. 17, 2006  (TW)  ............... 95105349 A

(51) Int. Cl.
*G06K 7/10*   (2006.01)
*G06K 7/14*   (2006.01)
*F21V 29/00*  (2006.01)
*B60Q 1/06*   (2006.01)

(52) U.S. Cl. ............ 235/454; 362/264; 362/373
(58) Field of Classification Search ............ 235/454, 235/462.42, 462.43; 399/211, 94, 220; 347/222, 347/223, 263; 362/6, 264, 373
See application file for complete search history.

(56) References Cited

U.S. PATENT DOCUMENTS

| | | | |
|---|---|---|---|
| 6,344,869 B2 * | 2/2002 | Sasaki et al. | 347/222 |
| 2002/0106217 A1 * | 8/2002 | Ando | 399/211 |
| 2003/0117710 A1 * | 6/2003 | Miyamoto | 359/613 |
| 2005/0094389 A1 * | 5/2005 | Peng et al. | 362/218 |

FOREIGN PATENT DOCUMENTS

JP    2002-232650 A  *  8/2002

* cited by examiner

*Primary Examiner*—Jared J Fureman
(74) *Attorney, Agent, or Firm*—Winston Hsu

(57) ABSTRACT

An optical scanning module includes a housing, a light source and a first heat-dissipating sheet. The light source is disposed inside the housing for emitting a source light to be projected onto the object. The light source includes an electrode wrapped by an electric-insulating and heat-conducting rubber. The first heat-dissipating sheet is arranged on a surface of the housing and in contact with the electric-insulating and heat-conducting rubber.

4 Claims, 4 Drawing Sheets

OPTICAL SCANNING MODULE

FIELD OF THE INVENTION

The present invention relates to an optical scanning module, and more particularly to an optical scanning module of an image scanner for scanning an object.

BACKGROUND OF THE INVENTION

Flatbed image scanners are widely used in offices or homes for scanning for example documents, photographs or films. The scanned images can be converted into electronic file, which can be directly stored in a computer or further processed by the computer. Referring to FIG. 1(a), a schematic view of a flatbed image scanner is shown. As shown in FIG. 1(a), the flatbed image scanner 1 comprises a transparent platform 11 and an optical scanning module 13. The transparent platform 11 is used for placing thereon the object 12 to be scanned. The optical scanning module 13 is the main component of the flatbed image scanner 1. After the object 12 is placed on the transparent platform 11, the optical scanning module 13 is moved along the scanning direction so as to scan the object. The scanned images of the object 12 are then inputted into a computer and processed by the computer.

Please refer to FIG. 1(b), which is a cross-sectional side view illustrating the internal components of the optical scanning module 13. In the housing 130 of the optical scanning module 13, a light source 131, a reflective mirror set 132, an optical lens 133 and an optical sensor 134 are provided. A light-transmissible window 135 is arranged in the top surface of the housing 130. The process for performing a scanning operation will be illustrated as follows. Firstly, the light emitted by the light source 131 is projected onto the object 12 to be scanned. The light reflected from the opaque object 14 is then transmitted into the optical scanning module 13 through the light-transmissible window 135, which is arranged in the top surface of the housing 130. After passing through the light-transmissible window 135, the light is successively reflected by the plural reflective mirrors of the reflective mirror set 132, and then focused by the optical lens 133. The focused light is then imaged onto the optical sensor 134 to convert the optical signals reflected from the scanned object 12 into corresponding image signals.

As known, heat is generated during the optical scanning module performs the scanning operation. On the other hand, in a case an image scanner having relatively large volume and ordinary resolution, the electronic components included in the optical scanning module, for example the optical sensor, are not evidently and adversely influenced by the heat generation.

Since the image scanner is developed toward increased resolution and slim volume, the heat generated from the optical scanning module may impair the scanning quality of the image scanner. Therefore, it is desired to remove the heat generated from the optical scanning module.

An optical scanning module having a heat-dissipating device is described in Taiwanese Patent Gazette No. 520822, entitled "Heat-dissipating device of optical sensor and optical scanning module" and the contents of which are hereby incorporated by reference. A cross-sectional side view of the optical scanning module as disclosed in Taiwanese Patent Gazette No. 520822 is illustrated in FIG. 2. As shown in FIG. 2, a heat-dissipating device 236 is disposed on the back side of the optical sensor 234 of the optical scanning module 23. The heat-dissipating device 236 includes a heat conducting pipe 2361 filled with a cooling solution therein and a plurality of heat-dissipating sheets 2362. During scanning operation, the heat generated from the optical sensor 234 of the optical scanning module 23 is adsorbed by the cooling solution contained in the heat conducting pipe 2361 and then conducted to the heat-dissipating sheets 2362. The heat is radiated from the heat-dissipating sheets 2362 to the ambient air so as to achieve the object of heat dissipation. Unfortunately, since the heat conducting pipe and the heat-dissipating sheets 2362 occupy much space of the optical scanning module, the image scanner fails to be made in a slim type.

In views of the above-described disadvantages of the prior art, the applicant keeps on carving unflaggingly to develop an improved optical scanning module according to the present invention through wholehearted experience and research.

SUMMARY OF THE INVENTION

It is an object of the present invention to provide an optical scanning module for effectively dissipating the heat generated from the lamp tube therein without considerably increasing the overall volume therein.

In accordance with an aspect of the present invention, there is provided an optical scanning module of an optical scanning apparatus for scanning an object. The optical scanning module comprises a housing, a light source and a first heat-dissipating sheet. The light source is disposed inside the housing for emitting a source light to be projected onto the object. The light source includes an electrode wrapped by an electric-insulating and heat-conducting rubber. The first heat-dissipating sheet is arranged on a surface of the housing and in contact with the electric-insulating and heat-conducting rubber.

In an embodiment, the optical scanning module further comprises a window, a reflective mirror set, a lens and an optical sensor. The window is arranged in a top surface of the housing and allowing the light reflected from the object to penetrate therethrough. The reflective mirror set successively reflects the light coming from the object. The lens focuses the light coming from the reflective mirror set. The optical sensor is used for receiving the light focused by the lens and converting the focused light into corresponding image signals.

In an embodiment, the light source is a cold cathode fluorescent lamp. The cold cathode fluorescent lamp further includes another electrode wrapped by another electric-insulating and heat-conducting rubber.

In an embodiment, the optical scanning module further comprises a second heat-dissipating sheet arranged on the surface of the housing and in contact with the another electric-insulating and heat-conducting rubber, which wraps around the another electrode. The first heat-dissipating sheet and the second heat-dissipating sheet are spaced apart from each other.

In an embodiment, the first heat-dissipating sheet is a metallic sheet or a metallic fiber sheet with high thermal conductivity.

In an embodiment, the first heat-dissipating sheet is attached onto the surface of the housing via adhesive material.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
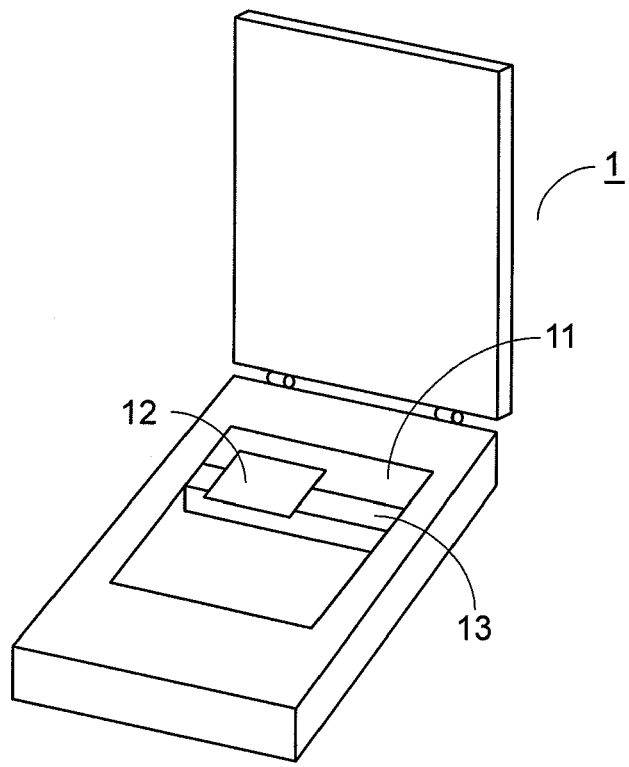
FIG. 1(a) is a schematic view of a typical flatbed image scanner.
Figure 1B:
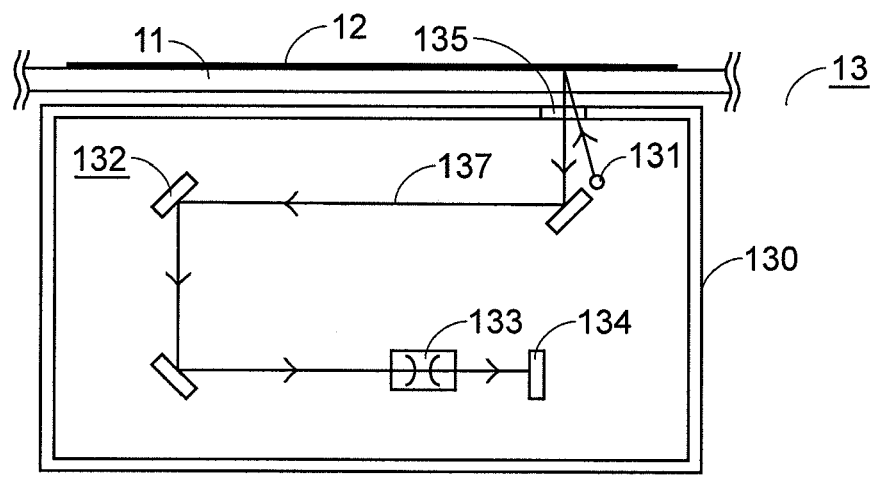
FIG. 1(b) is a schematic cross-sectional side view illustrating the internal components of the optical scanning module of the flatbed image scanner.
Figure 2:
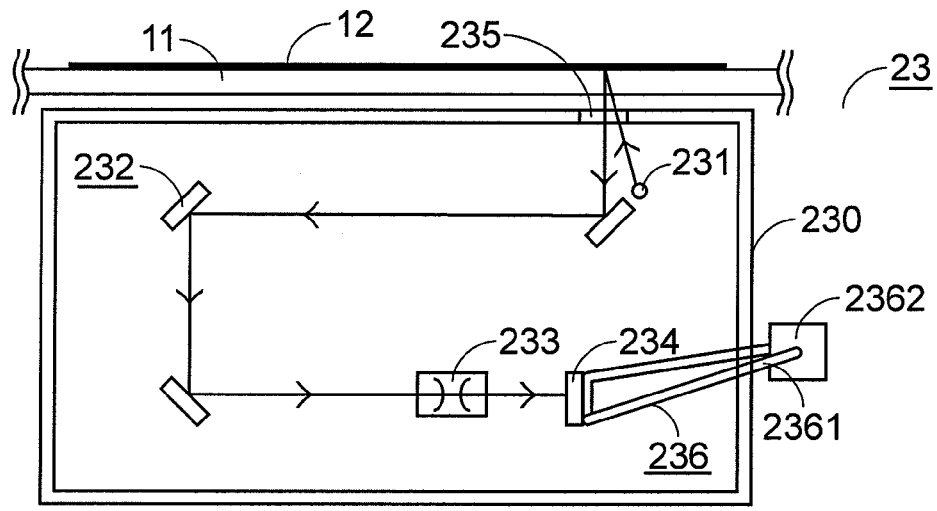
FIG. 2 is a schematic cross-sectional side view of a conventional optical scanning module having a heat-dissipating device.
Figure 3:
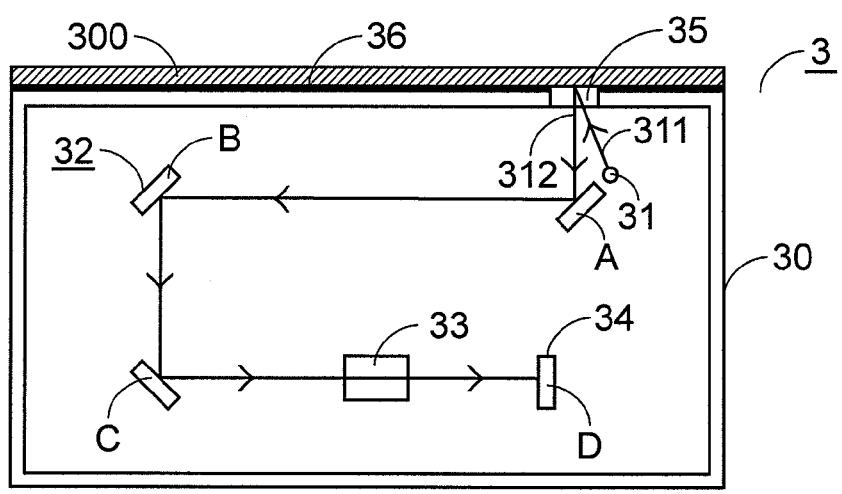
FIG. 3 is a schematic cross-sectional side view illustrating the internal components of the optical scanning module according to a preferred embodiment of the present invention.

Referring to FIG. 3, a schematic cross-sectional side view of the internal components of the optical scanning module according to a preferred embodiment of the present invention is illustrated. The optical scanning module 3 of FIG. 3 is applicable to an image scanner (not shown) for scanning an object 300 to be scanned. In the housing 30 of the optical scanning module 3, a light source 31, a reflective mirror set 32, an optical lens 33 and an optical sensor 34 are provided. A light-transmissible window 35 is arranged in the top surface of the housing 30. The operation principles of the related components of the optical scanning module 3 are similar to those described in FIG. 1(b), and are not redundantly described herein.

An exemplary optical sensor 34 of the optical scanning module 3 is a charge couple device (CCD). Cooperatively, the light source 31 is a cold cathode fluorescent lamp. Since the heat generated from the cold cathode fluorescent lamp is responsible for most generated heat of the optical scanning module 3, it is important to remove the heat generated from the cold cathode fluorescent lamp. In this embodiment, a heat dissipating member 36 is arranged on the housing 30 of the optical scanning module 3 for dissipating away the heat generated from the cold cathode fluorescent lamp.

Figure 4A:
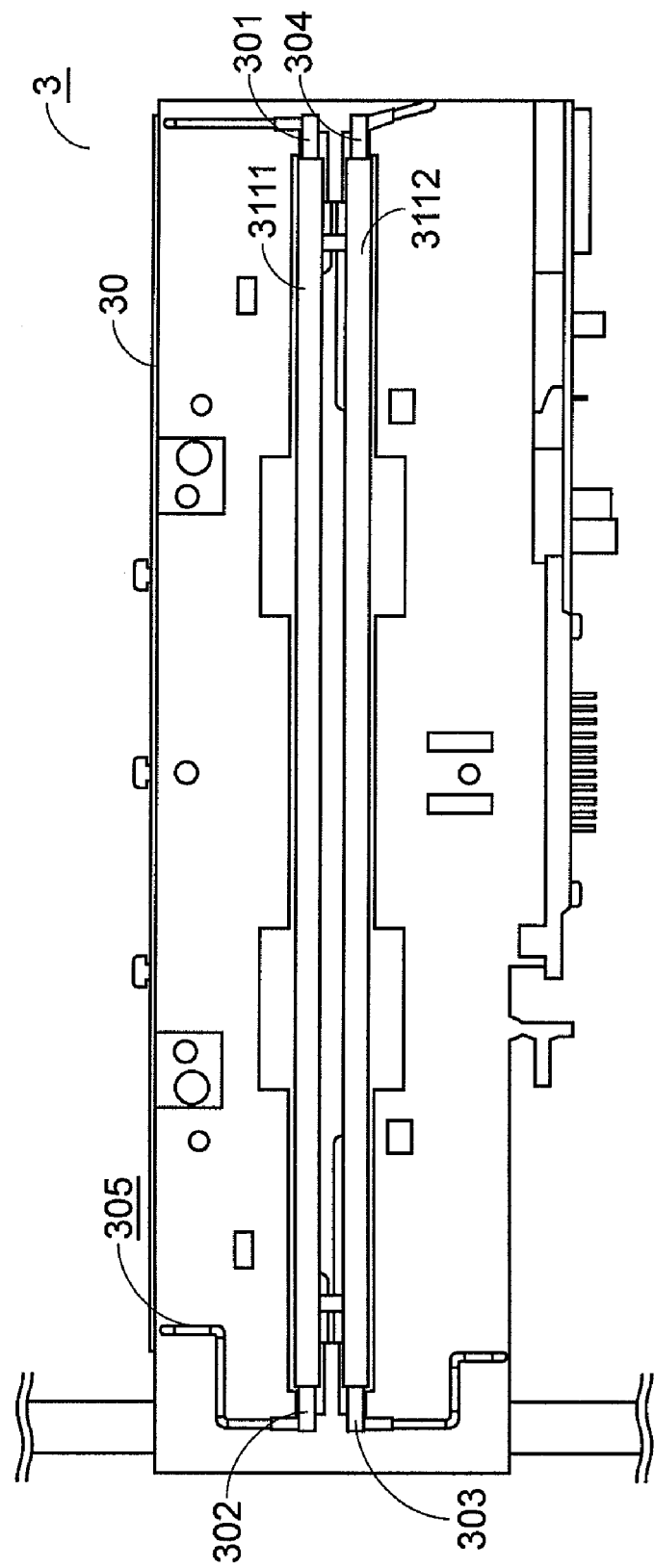
FIG. 4(a) is a schematic top view of the optical scanning module, wherein the heat dissipating member has not been attached onto the optical scanning module.
Figure 4B:
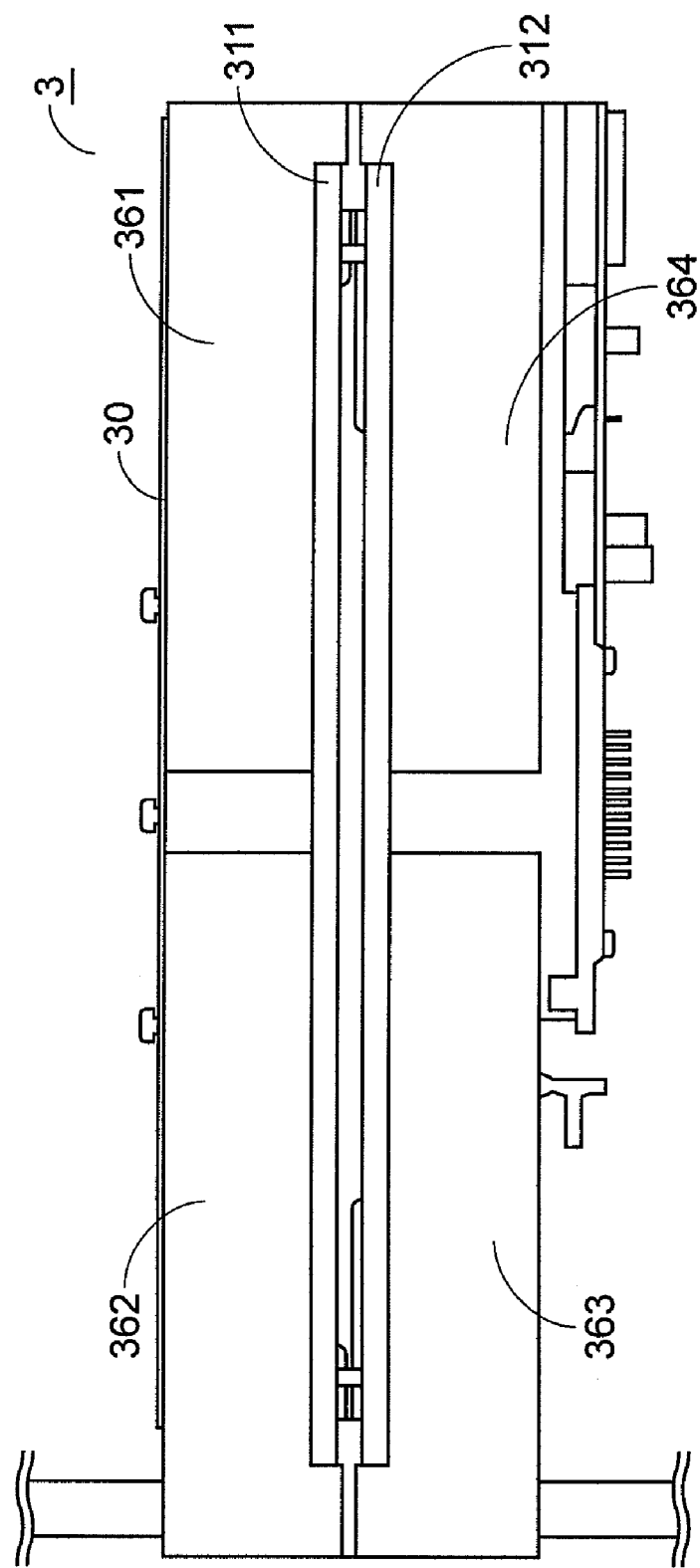
FIG. 4(b) is a schematic top view of the optical scanning module, wherein the heat dissipating member has been attached onto the optical scanning module.

Please refer to FIGS. 4(a) and 4(b), which are schematic top views of the optical scanning module 3 as shown in FIG. 3.

In FIG. 4(a), the heat dissipating member 36 has not been attached onto the optical scanning module 3. As shown in FIG. 4(a), the optical scanning module 3 has a first light source 3111 and a second light source 3112. Depending on the manufacturer's design, the number of the light sources may be varied. The first light source 3111 and the second light source 3112 are cold cathode fluorescent lamps. Both ends of the first light source 3111 have electrodes (not shown) electrically connected to other electronic components of the optical scanning module 3 via the electrical wires 305. These two electrodes are wrapped by electric-insulating and heat-conducting rubbers 301 and 302, respectively. Likewise, the two electrodes of the second light source 3112 are wrapped by electric-insulating and heat-conducting rubbers 303 and 304, respectively.

Referring to FIG. 4(b), the heat dissipating member 36 has been attached onto the optical scanning module 3. As shown in FIG. 4(b), the heat dissipating member 36 includes a first heat-dissipating sheet 361, a second heat-dissipating sheet 362, a third heat-dissipating sheet 363 and a fourth heat-dissipating sheet 364. The electric-insulating and heat-conducting rubbers 301 and 302 wrapping around the electrodes at both ends of the first light source 3111 and the electric-insulating and heat-conducting rubbers 303 and 304 wrapping around the electrodes at both ends of the second light source 3112 are covered by the first heat-dissipating sheet 361, the second heat-dissipating sheet 362, the third heat-dissipating sheet 363 and the fourth heat-dissipating sheet 364, respectively. In addition, most area of the top surface of the housing 30 excluding the light exit is also covered by the heat-dissipating sheets 361, 362, 363 and 364. The heat dissipating member 36 is attached onto the top surface of the housing 30 via adhesive material. Each of the heat-dissipating sheets 361, 362, 363 and 364 is a metallic sheet or a metallic fiber sheet with high thermal conductivity. The thickness for each of the heat-dissipating sheets 361, 362, 363 and 364 is ranged between 0.07 mm and 0.1 mm. Moreover, the heat-dissipating sheets 361, 362, 363 and 364 are spaced apart from each other, thereby avoiding electromagnetic interference (EMI).

Although the temperature at the high voltage terminal of the cold cathode fluorescent lamp may reach approximately 100 degrees Celsius when the cold cathode fluorescent lamp is turned on, the heat generated from the cold cathode fluorescent lamp will be effectively conducted to the heat-dissipating sheets 261, 262, 263 and 264 through the electric-insulating and heat-conducting rubbers 301, 302, 303 and 304.

From the above description, since the heat-dissipating sheets are in contact with the electrodes at the ends of the lamp tubes which generate most heat of the optical scanning module, the heat dissipating member is effective to dissipate heat of the optical scanning module. In addition, since the heat-dissipating sheets are attached on the top surface of the optical scanning module, the overall volume of the optical scanning module is not considerably increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical scanning module of an optical scanning apparatus for scanning an object, said optical scanning module comprising:

a housing;

a window arranged in a top surface of said housing;

a cold cathode fluorescent lamp for emitting a source light to be projected onto said object through the window, wherein said cold cathode fluorescent lamp includes an electrode wrapped by an electric-insulating and heat-conducting rubber and another electrode wrapped by another electric-insulating and heat-conducting rubber;

a first heat-dissipating sheet arranged on said top surface of said housing and in contact with said electric-insulating and heat-conducting rubber; and a second heat-dissipating sheet arranged on said top surface of said housing and in contact with said another electric-insulating and heat-conducting rubber;

wherein said first heat-dissipating sheet and said second heat-dissipating sheet are spaced apart from each other.

2. The optical scanning module according to claim 1 further comprising:
- a window arranged in a top surface of said housing and allowing the light reflected from said object to penetrate therethrough;
- a reflective mirror set for successively reflecting the light coming from said object;
- a lens for focusing the light coming from said reflective mirror set; and
- an optical sensor for receiving the light focused by said lens and converting the focused light into corresponding image signals.

3. The optical scanning module according to claim 1 wherein said first heat-dissipating sheet is a metallic sheet or a metallic fiber sheet with high thermal conductivity.

4. The optical scanning module according to claim 1 wherein said first heat-dissipating sheet is attached onto said surface of said housing via adhesive material.

* * * * *